US006996831B1

(12) United States Patent
Zoller et al.

(10) Patent No.: US 6,996,831 B1
(45) Date of Patent: Feb. 7, 2006

(54) METHOD AND SYSTEM FOR ALLOWING A PERL APPLICATION TO COMMUNICATE WITH A DISTRIBUTED OBJECT VIA CORBA

(75) Inventors: Gregory Zoller, Raleigh, NC (US); Samir Mehta, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 538 days.

(21) Appl. No.: 09/724,205

(22) Filed: Nov. 27, 2000

(51) Int. Cl.
*G06F 9/00* (2006.01)

(52) U.S. Cl. ..................................... 719/331

(58) Field of Classification Search ................ 709/327; 719/310, 316, 315, 331
See application file for complete search history.

(56) References Cited

U.S. PATENT DOCUMENTS

| 6,208,345 B1 * | 3/2001 | Sheard et al. ............... 345/853 |
| 6,233,622 B1 * | 5/2001 | Atsatt et al. ................ 719/315 |
| 6,496,833 B1 * | 12/2002 | Goldberg et al. ........... 707/102 |
| 6,609,158 B1 * | 8/2003 | Nevarez et al. ............. 719/316 |

OTHER PUBLICATIONS

Mowbray, "The Essential Corba", 1995, Katherine Schowalter, p. 35-53, 184-187, 212-213, 250-255.*
UCS, "UCS Architecture", Sep. 1999, p. 1-2.*
Mowbray, "The Essential CORBA System Intergration Using Distributed Objects" 1994, Katherine Schowalter, pp. 231-267.*

* cited by examiner

*Primary Examiner*—Sue Lao
*Assistant Examiner*—Phuong N. Hoang (57) ABSTRACT

A method and system for allowing a PERL application to communicate with distributed objects. One embodiment comprises a method in which first an adapter program receives a request from a PERL application. The PERL request specifies a distributed object with which the PERL application desires to communicate. The adapter program translates the request from the PERL application. For example, the adapter program translates PERL data structures into a format which is compliant with a communication program. Then, the adapter program calls the communication program to access the distributed object via Common Object Request Broker Architecture (CORBA). After the adapter program receives a response from the communication program, the adapter translates the response to a form suitable for the PERL application. For example, the adapter program may need to translate a data structure into a PERL compliant form. Then, the adapter program passes the response to the PERL application.

13 Claims, 6 Drawing Sheets

METHOD AND SYSTEM FOR ALLOWING A PERL APPLICATION TO COMMUNICATE WITH A DISTRIBUTED OBJECT VIA CORBA

FIELD OF THE INVENTION

The present invention relates to the field of distributed computing. Specifically, the present invention relates to a method and system for allowing a Practical Extraction Report Language (PERL) application to communicate with distributed objects via Common Object Request Broker Architecture (CORBA).

BACKGROUND ART

It is proving increasingly useful, even virtually necessary for a computer program running on one computer to communicate with program running on another computer. For example, in a web based environment, a program on the client side may communicate with distributed object on the server side to assist the client program in its processing. However, the client program may be written in a different computer language and even running on a different computing platform. Consequently, the client program needs a way to bridge these technical differences to access the program on the server side.

One conventional way to allow one program to communicate with another is to write a proprietary program. For example, the Practical Extraction Report Language (PERL) may be able to communicate with C++ and with JAVA by writing a proprietary program. However, the proprietary program may not be compliant with an industry standard. Therefore, applications may need to be re-written in order to use the proprietary program.

Common Object Request Broker Architecture (CORBA) provides for an industry standard that allows a computer program (e.g., a client program) to communicate with programs (e.g., objects) which are running either on another computer (e.g., a server) or on the same computer. This may be true even if the client computer system and server computer system are running programs written in different languages and running on different computing platforms. However, it is not true that all client programs may communicate with server programs in this fashion. For example, while the Object Management Group (OMG) has defined a specification for CORBA support for C++ and JAVA, the OMG has not provided such a specification for PERL.

Therefore, a need exists for a method and system for allowing a PERL application to communicate with distributed object via CORBA. A further need exists for such a system and method which does not require changes to the server side distributed object code. A still further need exists for such a method and system which is transparent to the client (PERL) applications.

SUMMARY OF THE INVENTION

The present invention provides for a method and system which allow a PERL application to communicate with distributed objects via CORBA. The present invention provides for such a method and system which does not require changes to the server side distributed object code. The present invention provides for such a method and system which is transparent to the client (PERL) application. The present invention provides these advantages and others not specifically mentioned above but described in the sections to follow.

A method and system for allowing a PERL application to communicate with distributed objects is disclosed. One embodiment comprises a method in which first an adapter program receives a request from a PERL application. The PERL request specifies a distributed object with which the PERL application desires to communicate. The adapter program translates the request from the PERL application. For example, the adapter program translates PERL data structures into a format which is compliant with a communication program. Then, the adapter program makes a call to the communication program to access the distributed object via Common Object Request Broker Architecture (CORBA). After the adapter program receives a response from the communication program, the adapter translates the response to a form suitable for the PERL application. For example, the adapter program may need to translate a data structure into a PERL compliant form. Additionally, the adapter program may handle exceptions, as PERL may not handle these well. Then, the adapter program passes the response to the PERL application.

In one embodiment, the adapter program and the PERL application are written in different programming languages. For example, the adapter program is written in C/C++.

In still another embodiment, the PERL application is located on a first computer system and the distributed object is located on a second computer system. For example, the second computer system may be a server.

Yet another embodiment provides for a computer readable medium having stored therein a computer program that when executed by a processor causes a computer system to implement a method for allowing a PERL application to communicate with distributed objects via CORBA.

DETAILED DESCRIPTION OF THE INVENTION

In the following detailed description of the present invention, a system and method for allowing a Practical Extraction Report Language (PERL) application to communicate with distributed objects via Common Object Request Broker Architecture (CORBA), numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Allowing a PERL Application to tommunicate With Distributed Objects Via CORBA The present invention provides for a method and system for allowing a Practical Extraction Report Language (PERL) application to communicate with distributed objects via Common Object Request Broker Architecture (CORBA). An embodiment provides for an adapter program, which functions as a sort of glue, between software layers on the PERL (client) side of the environment. The adapter program translates between the data structures used in PERL and those used by the CORBA. Additionally, the adapter program handles other matters, such as handling programming exceptions.

Figure 1:
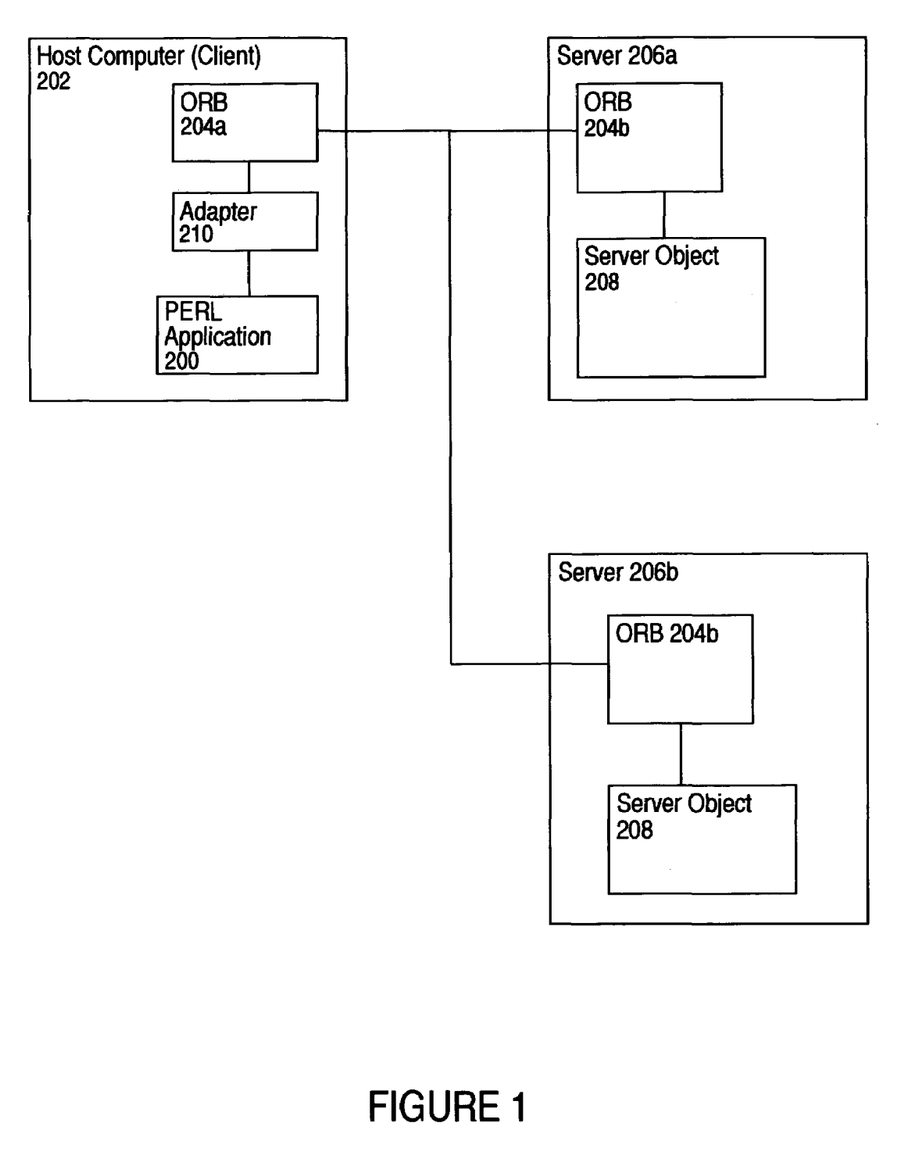
FIG. 1 is a block diagram illustrating a client side PC with a PERL application communicating with a server object via Object Request Brokers (ORBs), according to an embodiment of the present invention.

FIG. 1 illustrates a PERL application 200 communicating with various server objects 208 via Object Request Brokers (ORBs) 204. When the PERL application 200 residing on a host computer system 202 wishes to communicate with an object 208 on a server 206, the PERL application 200 makes a request via the object request broker (ORB) 204. The server 206 may be on a Local Area Network (LAN), Wide Area Network (WAN), an Intranet, the Internet, or the like.

The request passes through the adapter program 210, which performs the necessary translations for the PERL application 200 to inter-operate with the client ORB 204*a*. The ORB 204*a* on the client side (e.g., host computer 202) communicates with the ORB 204*b* on the server side with messages per the General Inter-ORB Protocol (GIOP). If the server 206 is accessed via the Internet or Intranet, then messages are communicated via the Internet Inter-ORB Protocol (IIOP). In another embodiment, the PERL application 200 and the object 208 reside on the same computer system, for example, they both exist on host computer 202.

The server ORB 204*b* converts the request into a call on the server object 208 and then returns the results in a GIOP reply to the client ORB 204*a*. Then, the client ORB 204*a* converts the reply into a object reply, which the adapter program 210 translates for the PERL application 200. Thus, the adapter program 210 provides translations so that a PERL application 200 may communicate with the server object 208. This is a feat which the PERL application 200 would not normally be able to do because of the lack of a standard specification for CORBA support for PERL. Furthermore, the process is transparent to the PERL application 200, in that no modifications need to be made to the PERL application 200. In the preferred embodiment, the PERL language and the ORB libraries use the same operating system libraries.

Figure 2:
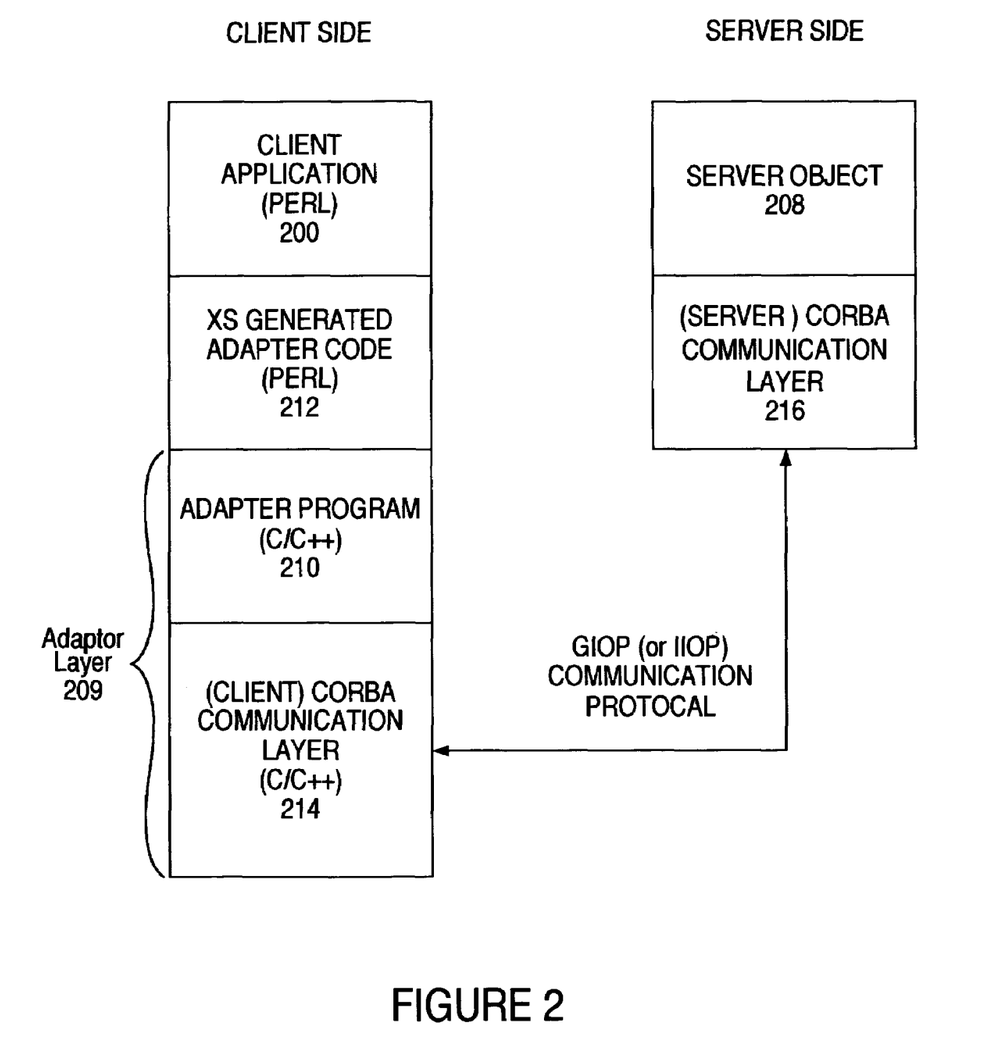
FIG. 2 is a logical block diagram illustrating the relationship between an adapter program and other software in a client/server environment, according to an embodiment of the present invention.

FIG. 2 illustrates the relationship between an adapter program 210 and other software layers in a client/server environment, according to one embodiment. The client CORBA communication layer 214 communicates with the server CORBA layers communicate 216 via the GIOP. The client CORBA communication layer 214 may comprise a client stub (FIG. 3, 314) and an ORB library (not shown). The adapter program 210 and the client CORBA communication layer 214 may be said to comprise an adapter layer 209.

By providing PERL to C mappings, PERL external subroutine (XS) provides a good interface to C from PERL. Still referring to FIG. 2, the XS generated adapter code 212, written in PERL, takes advantage of this to help build the bridge between PERL and CORBA. The adapter program 210 is written in C/C++, in the preferred embodiment. However, the present invention is not to be limited to writing the adapter program 210 in the C/C++ programming language.

Still referring to FIG. 2, the adapter program 210 receives a request from the PERL application 200. The adapter program 210 converts the PERL call to a CORBA request. The adapter program 210 also receives the object reply from, for example, the client CORBA communication layer 214. The adapter program 210 will make whatever changes are necessary to the reply before passing it on to the PERL application 200.

Still referring to FIG. 2, no modifications are required on the server side. The server object 208 need not be written in C/C++. The server object 208 may be written in, for example, JAVA. The server side may be operable to perform a business action, such as adding a new user or updating a user preference. The present invention does not require modifications to the server side. Additionally, embodiments of the present invention do not require any modifications to the PERL application 200.

In one embodiment, the PERL application 200 calls a server 206, which contains data which is spread over many databases. For example, the data may be user preferences or the like. The server 206 contains an ORB 204*b* that the present embodiment is able to communication with because of the adapter program 210. In this fashion, the PERL application 200 may update user preferences which may be stored over many different databases, even if the PERL application 200 does not know the physical location of the databases.

Figure 3:
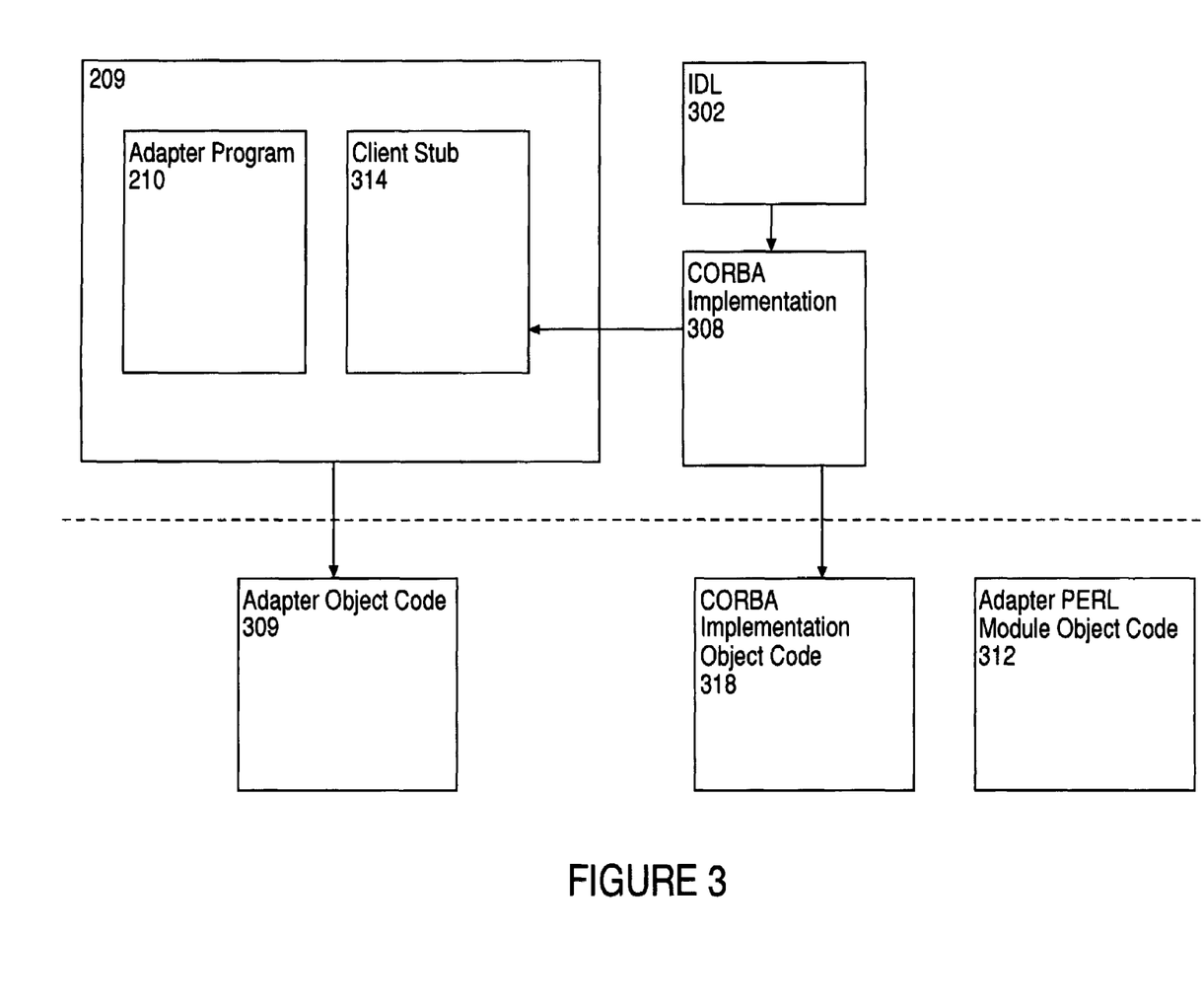
FIG. 3 is a logical block diagram illustrating source code and corresponding object code, according to an embodiment of the present invention.

Referring now to FIG. 3, the adapter/client stub 314 is created by the CORBA implementation 308 (e.g., vendor tool) using the Interface Definition Language (IDL) 302. The adapter/client stub 314 is created in the ° C./C++' programming language, in the preferred embodiment. However, client stubs 314 may be created in languages other than C/C++. The adapter/client stub 314 is compiled with the adapter program 210 to provide the adapter object code 309. When the PERL application 200 runs it may dynamically link to adapter object code 309, the CORBA implementation object code 318, and the adapter PERL module object code 312.

Figure 4:
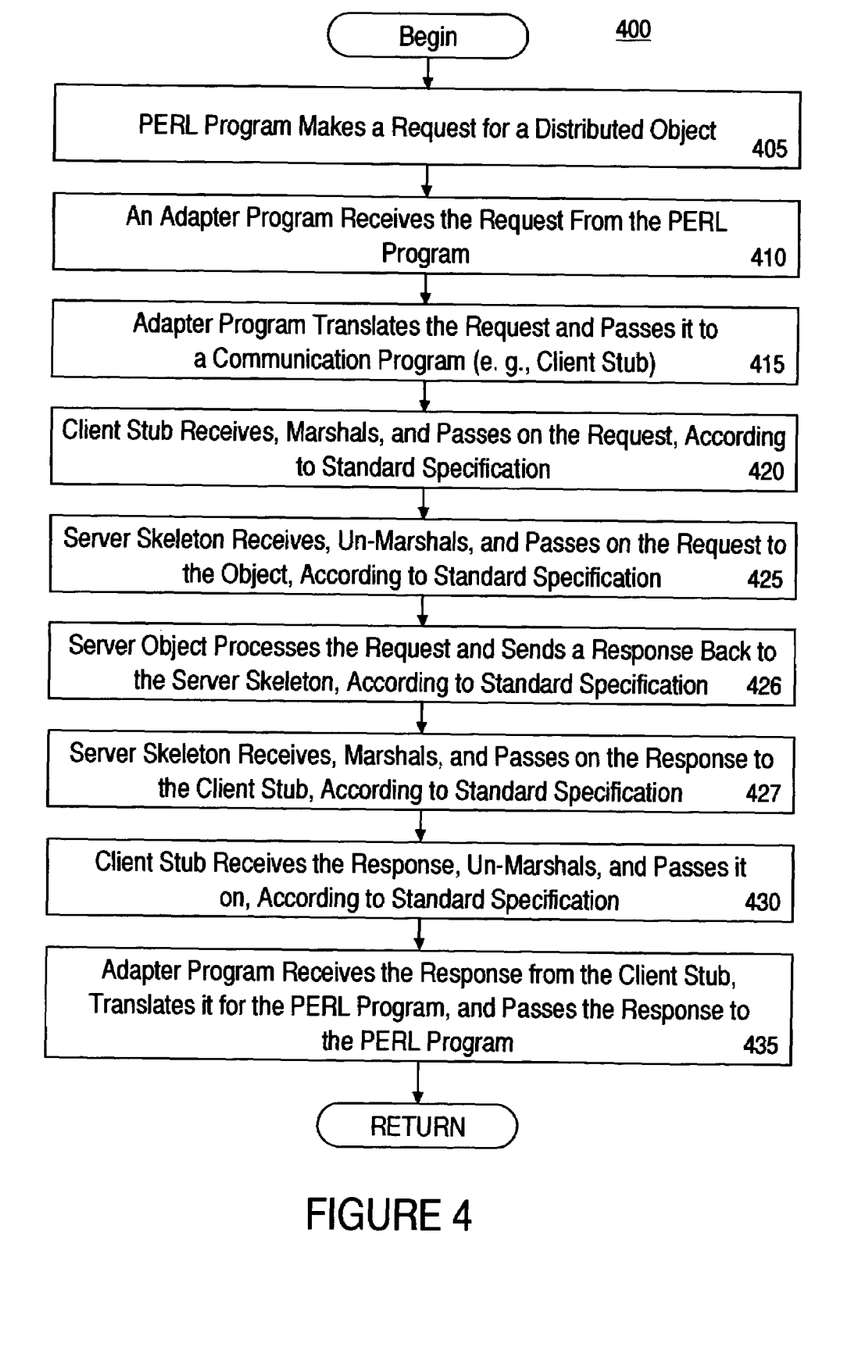
FIG. 4 is a flowchart illustrating the steps of a process of a PERL application making a call to a distributed object, according to an embodiment of the present invention.

FIG. 4 is a flowchart illustrating the steps of a process 400 of allowing a PERL application 200 to communicate with a distributed object via CORBA, according to an embodiment of the present invention. In step 405, a PERL application 200 makes a call to communicate with a distributed object 208.

In step 410, an adapter program 210 receives the request for the distributed object 208 from the PERL application 200. The request (e.g., call) may be in the C programming language. The data structures in the request will be compliant with the Practical Extraction Report Language.

In step 415, the adapter program 210 translates the request (call). For example, data structures may need to be transformed from a PERL 200 compliant format to a client CORBA communication layer 214 compliant format. PERL external subroutine (XS) generated adapter code 212 may be used to provide mappings between PERL and C, thus assisting the translation process. The data structure format for the client CORBA communication layer 214 will be compliant with the data structures on the server 206. The adapter 210 may be written in C/C++ and may be interfacing with a layer of code (e.g., client CORBA communication layer 214) also written in C/C++. Additionally, the adapter program 210 converts the PERL call to a CORBA request.

In step 420, the client CORBA communication layer 214 receives, marshals, and passes the request on, according to standard specification. For example, the client CORBA communication layer 214 communicates with a server CORBA communication layer 216 via a GIOP or an IIOP as specified in CORBA. The client CORBA communication layer 214 treats the request it receives like a request received from an application which is compliant with CORBA. A suitable object request broker (ORB) 204 may be used to facilitate this step.

In step 425, the server CORBA communication layer 216 receives the request (e.g., it receives GIOP or IIOP messages from the client CORBA communication layer 214), unmarshals it, and passes it on the server side, according to standard specification. For example, the server side treats the request (e.g., call or message) as if it had come from a client application for which CORBA support is specified by an industry standard.

In step 426, the server object 208 processes the request and sends a response back to the server CORBA communication layer 216. In step 427, the server CORBA communication layer 216 receives the response, marshals it, and passes it on to the client CORBA communication layer 214. Both of these steps occur per standard specification. For example, they occur per a standard specified by the Object Management Group (OMG).

In step 430, the client CORBA communication layer 214 receives the response and passes it on to the adapter program 210 per standard specification. In this embodiment, the adapter 210 and the client CORBA communication layer 214 are written in the same programming language (e.g., C/C++).

In step 435, the adapter program 210 receives the response, translates it, and passes the response to the PERL application 200. In addition to translation, the adapter program 210 may perform other functions. For example, the programming language used by the adapter program 210 may have provisions for exceptions, whereas PERL 200 may not. Therefore, if an exception occurs, the adapter program 210 will handle the exception and notify the PERL application 200 in a suitable fashion.

Figure 6:
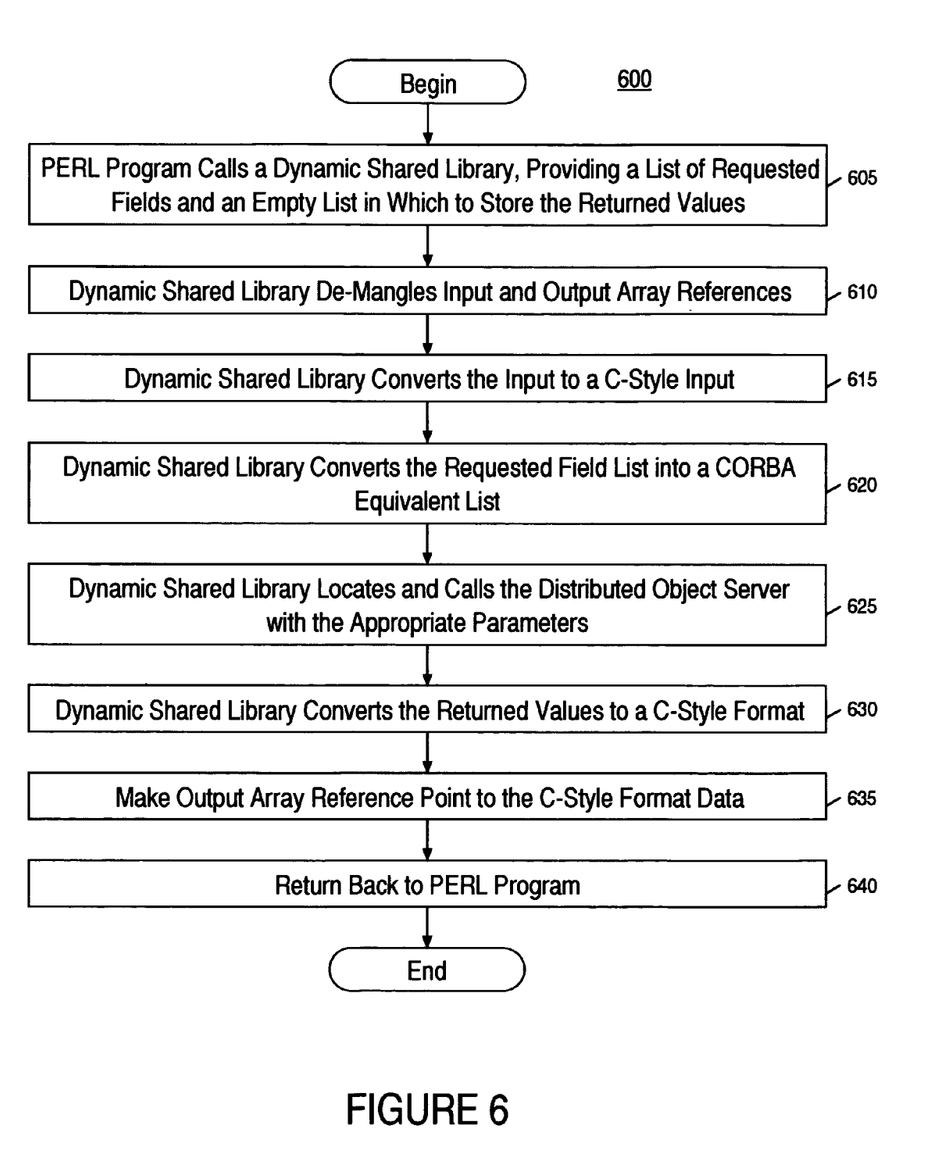
FIG. 6 is a flowchart illustrating the steps of a process of converting data types so that a PERL application may access a distributed object via CORBA, according to an embodiment of the present invention.

FIG. 6 illustrates the steps of a process 600 of translating a request from a PERL application 200 such that a distributed object 208 may be accessed via CORBA. In step 605, the PERL application 200 calls a adapter program 210, providing a list of requested fields and an empty list in which to store the returned values. In one embodiment, the adapter program 210 comprises a dynamic shared library.

In step 610 the adapter program 210 de-mangles the input and output array references. Next, the adapter program 210 converts the input to a C-style input, in step 615.

In step 620, the adapter program 210 converts the field list requested by the PERL application 200 into a CORBA equivalent list.

In step 625, the distributed object server is located and a call is made to it with the appropriate parameters.

When the values are returned from the call to the distributed object 208, the adapter program 210 converts the returned values into a C-style format, in step 630.

In step 635, the adapter program 210 makes the output array reference point to the C-style format data. In this fashion, the PERL application 200 is able to access the returned data. Then, control is returned to the PERL application 200, in step 640.

Appendix A contains exemplary psuedocode for a PERL application 200, exemplary psuedocode for a translation performed by the adapter program 210, as well as an exemplary IDL definition to generate a client stub 214.

Figure 5:
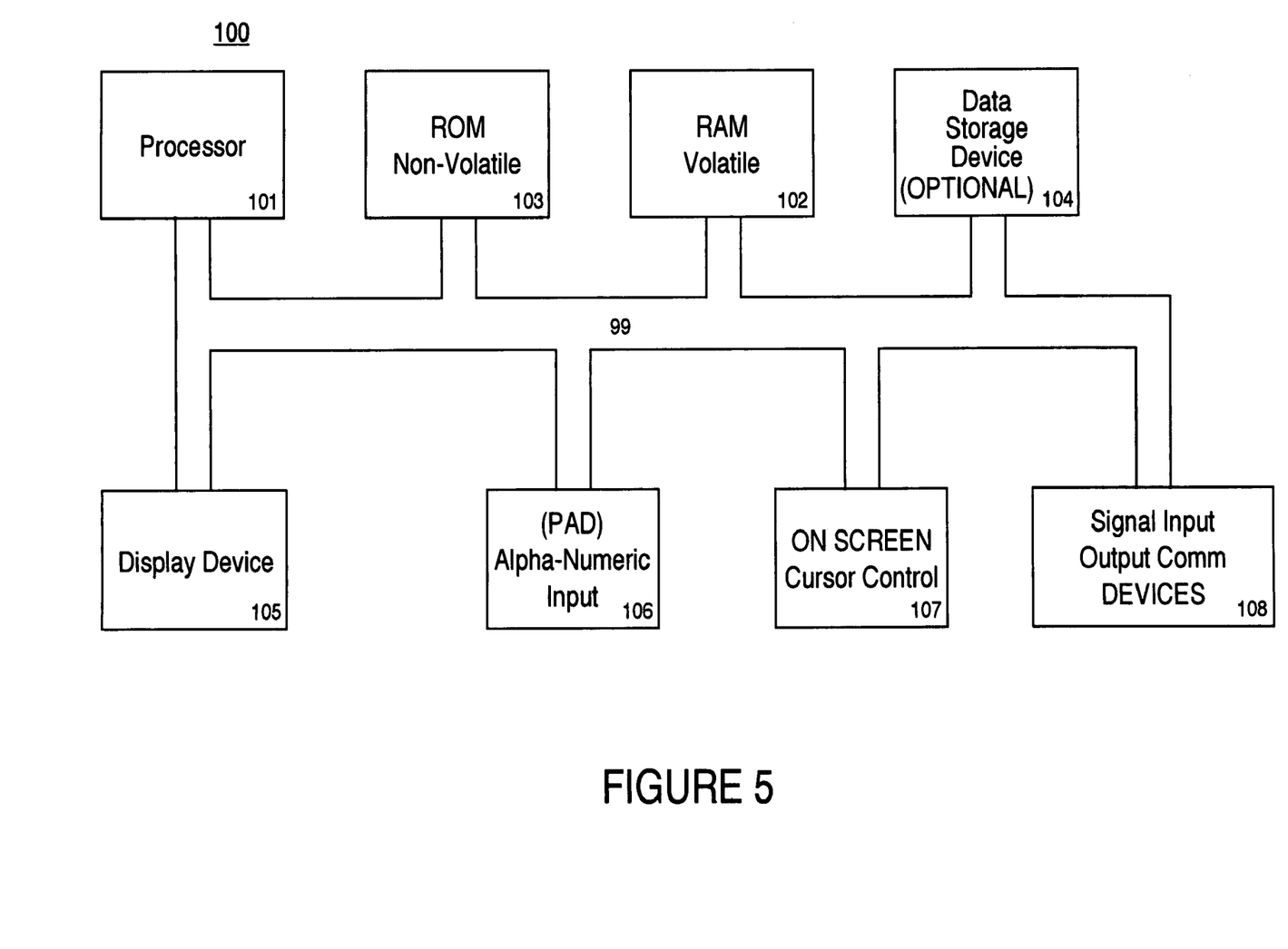
FIG. 5 is a schematic of a computer system, which may form a platform upon which to practice embodiments of the present invention.

FIG. 5 illustrates circuitry of host computer system 100, which may form a platform upon which to perform an embodiment of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

Also included in computer system 100 of FIG. 5 is an optional alphanumeric input device 106. Device 106 can communicate information and command selections to the central processor 101. For example, customer orders may be entered with device 106, as well as an order to release a credit hold. System 100 also includes an optional cursor control or directing device 107 coupled to the bus 99 for communicating user input information and command selections to the central processor 101. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Signal communication device 108 is also coupled to bus 99.

The preferred embodiment of the present invention, a system and method for allowing a Practical Extraction Report Language (PERL) application to communicate with distributed object via Common Object Request Broker Architecture (CORBA), is thus described. While the present invention has been described in particular embodiments, it should be appreciated that the present invention should not be construed as limited by such embodiments, but rather construed according to the below claims.

We claim:

1. A computer implemented method for a Practical Extraction Report Language (PERL) program to access a distributed object via Common Object Request Broker Architecture (CORBA), comprising:

said PERL program calling a dynamic shared library, said call providing a list of requested fields and an empty list in which to store returned values;

said dynamic shared library manipulating input and output array references in said call;

said dynamic shared library converting input array references to be compliant with a C programming language;

said dynamic shared library converting the requested field list into a CORBA equivalent list;

said dynamic shared library calling a Distributed Object Server responsive to said call from said PERL program; and said dynamic shared library providing said PERL program with access to values returned by said Distributed Object Server.

2. A computer implemented method as recited in claim 1, wherein said PERL program and said dynamic shared library execute as a single computing process.

3. A computer implemented method as recited in claim 1, wherein said dynamic shared library is written in a first programming language and said PERL program is written in second programming language.

4. A computer implemented method as recited in claim 3, wherein said dynamic shared library is substantially compliant with a C programming language.

5. A computer implemented method as recited in claim 3, further comprising:

said PERL program accessing user information over a number of databases by connecting to a server via said CORBA.

6. A computer implemented method as recited in claim 1, further comprising:

said Dynamic Shared Library converting said values returned by said Distributed Object Server to a format that is substantially compliant with a C programming language.

7. A computer readable medium having stored thereon program instructions for allowing a Practical Extraction Report Language (PERL) program to access a distributed object via Common Object Request Broker Architecture (CORBA), said instructions carrying out a method comprising:

said PERL program calling a dynamic shared library, said call providing a list of requested fields and an empty list in which to store returned values;

said dynamic shared library manipulating input and output array references in said call;

said dynamic shared library converting input array references to be compliant with a C programming language;

said dynamic shared library converting the requested field list into a CORBA equivalent list;

said dynamic shared library calling a Distributed Object Server responsive to said call from said PERL program; and said dynamic shared library providing said PERL program with access to values returned by said Distributed Object Server.

8. A computer readable medium as recited in claim 7, wherein said PERL program and said dynamic shared library execute as a single computing process.

9. A computer readable medium as recited in claim 7, wherein said dynamic shared library is written in a first programming language and said PERL program is written in second programming language.

10. A computer readable medium as recited in claim 9, wherein said dynamic shared library is substantially compliant with a C programming language.

11. A computer readable medium as recited in claim 7, further comprising:

said PERL program accessing user information over a number of databases by connecting to a server via said CORBA.

12. A computer readable medium as recited in claim 7, wherein said further comprises:

said Dynamic Shared Library converting said values returned by said Distributed Object Server to a format that is substantially compliant with a C programming language.

13. A computer system for providing communication between a Practical Extraction Report Language (PERL) program and a distributed object, said computer system comprising a processor:

means for call a dynamic shared library, wherein said call provides a list of requested fields and an empty list in which to store returned values;

means for manipulating input and output array references in said call;

means for converting input array references to be compliant with a C programming language;

means for converting the requested field list into a CORBA equivalent list;

means for calling a Distributed Object Server responsive to said call from said PERL program; and means for providing said PERL program with access to values returned by said Distributed Object Server.

* * * * *